US006630184B2

United States Patent
Chung et al.

(10) Patent No.: US 6,630,184 B2
(45) Date of Patent: Oct. 7, 2003

(54) CONTROLLABLE OVERRIDE ELECTRIC TOASTING APPARATUS

(75) Inventors: C. K. Chung, Fanling (HK); C. F., Guangzhou (CN)

(73) Assignee: Goldus Industrial Ltd., Fanling (HK)

( * ) Notice: Subject to any disclaimer, the term of this patent is extended or adjusted under 35 U.S.C. 154(b) by 0 days.

(21) Appl. No.: 09/737,731

(22) Filed: Dec. 14, 2000

(65) Prior Publication Data

US 2002/0073851 A1 Jun. 20, 2002

(51) Int. Cl.⁷ .................................................. A47J 37/08
(52) U.S. Cl. ......................... 426/233; 426/466; 426/523; 99/327; 99/332; 99/335; 99/338; 99/393; 99/400; 99/446
(58) Field of Search ............................... 99/327, 329 RT, 99/332, 335, 338, 393, 400, 444, 446; 426/233, 466, 523

(56) References Cited

U.S. PATENT DOCUMENTS

| 3,692,975 A | 9/1972 | Markus et al. ............... 219/202 |
| 4,188,865 A | 2/1980 | Bjarsch ........................ 99/327 |
| 5,304,782 A | 4/1994 | McNair et al. ............... 219/518 |
| 5,385,082 A | 1/1995 | Huggler et al. ............... 99/328 |
| 5,918,532 A | 7/1999 | Arnedo et al. ................ 99/327 |
| 6,230,611 B1 | 5/2001 | Mauffrey ..................... 99/327 |
| 6,240,834 B1 * | 6/2001 | Chen et al. .................... 99/327 |
| 6,250,212 B1 | 6/2001 | Yeung et al. ................. 99/391 |
| 6,298,772 B1 | 10/2001 | Nguyen et al. ............... 99/327 |
| 6,311,608 B1 | 11/2001 | Hardin et al. ................. 99/326 |
| 6,313,445 B1 | 11/2001 | Garneau et al. ............. 219/414 |
| 6,380,520 B1 * | 4/2002 | Nguyen ....................... 219/392 |
| 6,382,084 B2 * | 5/2002 | Chan et al. .................... 99/327 |

FOREIGN PATENT DOCUMENTS

DE 2658997 A * 6/1978

* cited by examiner

Primary Examiner—Drew Becker
(74) Attorney, Agent, or Firm—Oppenheimer Wolff & Donnelly LLP

(57) ABSTRACT

A controllable electric toasting apparatus primarily for use in the home permits power to be safely disconnected when items become jammed inside. In addition, a carriage assembly inside the toasting apparatus can be raised during a toasting cycle so that the items can be viewed without interrupting the toasting cycle. Also, if an item is smaller than usual and placed in the toasting apparatus, the carriage assembly can be raised beyond its initial raised position to allow convenient removal of the small item.

35 Claims, 4 Drawing Sheets

CONTROLLABLE OVERRIDE ELECTRIC TOASTING APPARATUS

BACKGROUND OF THE INVENTION

1. Field of the Invention

The present invention relates to an improvement in the design of electric toasters, particularly for those used in the home. In a typical toaster, an item is placed in an opening at the top of the toaster, usually in a vertical orientation. A tray is lowered against a spring and when the toasting cycle is completed, the item automatically pops up for removal. When the tray automatically pops up or is manually lifted, the power to heating elements within the toaster is cut off.

2. Description of the Related Art

Prior art toasters include timers that determine the amount of time that a toasting cycle will operate. During the toasting cycle heating elements apply heat to items in the toasters. One problem with prior art toasters is that the toasting cycle continues until the tray is raised, meaning that heat will continue to be applied if the item placed in the toaster becomes jammed or stuck. Therefore, if the tray is jammed the power to the heating element is not turned off. This can result in either the item being burned or the heating element overheating. This presents a dangerous condition since items in the tray could ignite, causing items around the toaster to also ignite, or the heating elements could melt wires inside the toaster, causing the toaster itself to ignite.

Another problem associated with prior art toasters involves the termination of power when the tray is released. Prior art toasters typically do not release the tray until the toasting cycle finishes. Therefore, when the tray is raised manually, such as when checking to see if an item is done toasting, the power turns off. If a user wants to check the toasting progress of items while the power is on, there is no way to lift the tray without turning the power off. As a result, if the item is not done, the user must reinitiate the toasting cycle after examining the items in the toaster body.

Another problem with prior art toasters involves the removal of an item after the completion of the toasting cycle. If a small item is placed in the toaster when the tray is in its raised position, the item may be below the top of the toaster. Removal of the item therefore either involves fingers, which may be burned, or a utensil such as a fork or knife, which may damage the toaster or cause electrical shock to the user.

SUMMARY OF THE INVENTION

The present invention discloses a controllable override electric toasting apparatus that automatically disengages power to a heating element when a carriage assembly becomes jammed at the end of a toasting cycle. Additionally, the carriage assembly may be manually lifted during a toasting cycle without shutting off the power, so that a user can see if items placed in the toaster are adequately toasted.

Additionally, the controllable override electric toasting apparatus of the present invention permits the carriage assembly to be lifted above its initial raised position. This allows smaller items to be easily removed from the toasting apparatus without having to risk burns or electric shock from the use of a foreign instrument.

DETAILED DESCRIPTION OF THE EMBODIMENTS

Figure 1:
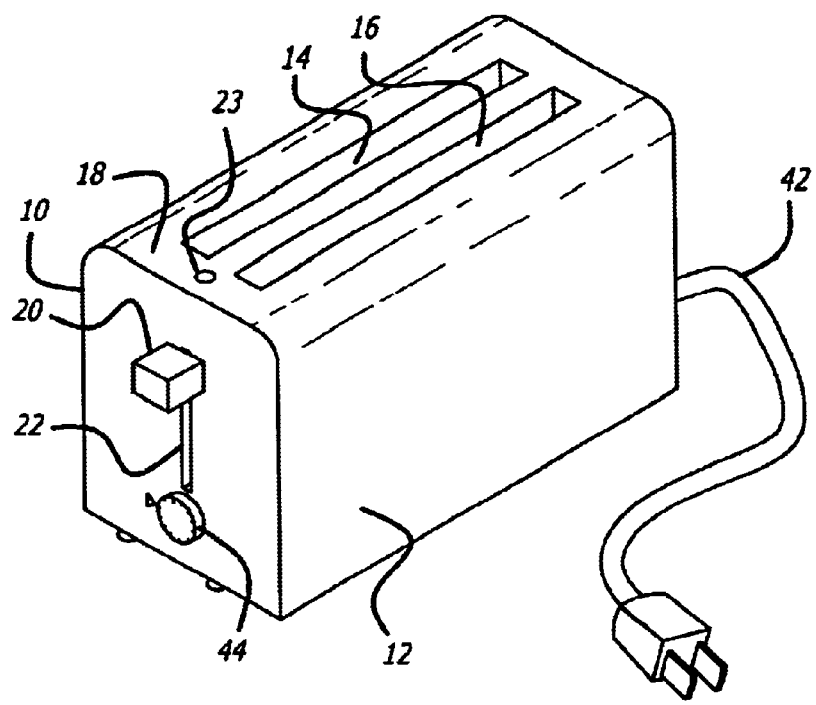
FIG. 1 is a front perspective view of the controllable override electric toasting apparatus of the present invention.

FIG. 1 shows a perspective view of the controllable override electric toasting apparatus of the present invention. A toasting apparatus 10 has a generally rectangular configuration forming a toaster body 12. The toaster body 12 includes two openings 14 and 16 in a top surface 18, and a closed end. The openings 14 and 16 in the top surface 18 receive items and align them in a vertical orientation in the toaster body 12. The toaster body 12 may hold a single item or a plurality of items at the same time. This specification will refer to the placement of both a single item and multiple items in the toaster body. Items commonly placed in toasting devices include bread, muffins, and other food products. It is to be understood that different embodiments of the toasting apparatus 10 may have different shapes and different numbers of openings, and that their orientation may be varied relative to the toaster body 12. For example, the toasting apparatus 10 may have one opening or it may have a plurality of openings capable of aligning many items in the toaster body 12. Also, the toasting apparatus 10 may have a shape other than rectangular, such as a sphere or pyramid, and the openings may be oriented other than on the top of the toasting apparatus 10, thereby aligning items in orientations other than vertical. The material used to make the toasting apparatus 10 and toaster body 12 may be metal, plastic, or any other material commonly used in the art of electric toasters.

The toasting apparatus 10 also includes a carriage assembly for supporting items placed in the toaster body 12. The carriage assembly includes a carriage control handle 20 disposed upon said carriage assembly such that the carriage assembly can be raised or lowered using the carriage control handle 20. In one embodiment, the carriage control handle 20 is sidably oriented relative to the toaster body 12 in an opening 22 in a side of the toaster body 12. In another embodiment, the carriage control handle 20 has an end that is disposed external to the toaster body 12 through the side for movement by a user. The carriage assembly also includes a carriage member 46 disposed within the toaster body 12.

FIG. 1 also shows a carriage release button 23 disposed on a surface of the toaster body 12. When pressed while items in the toaster body 12 are being toasted, the carriage release button 23 cuts power to the toaster body 12 by disengaging a pair of electromagnetic plates. This opens a switch in the circuit controlling the toasting of items in the toaster body 12 and allows the carriage member 46 to be raised. The carriage release button may be disposed on any surface of the toaster body. For example, the carriage release button may be disposed on the top surface 18, as shown in FIG. 1. In another embodiment, the carriage release button may be disposed on a side of the toaster body.

Figure 2:
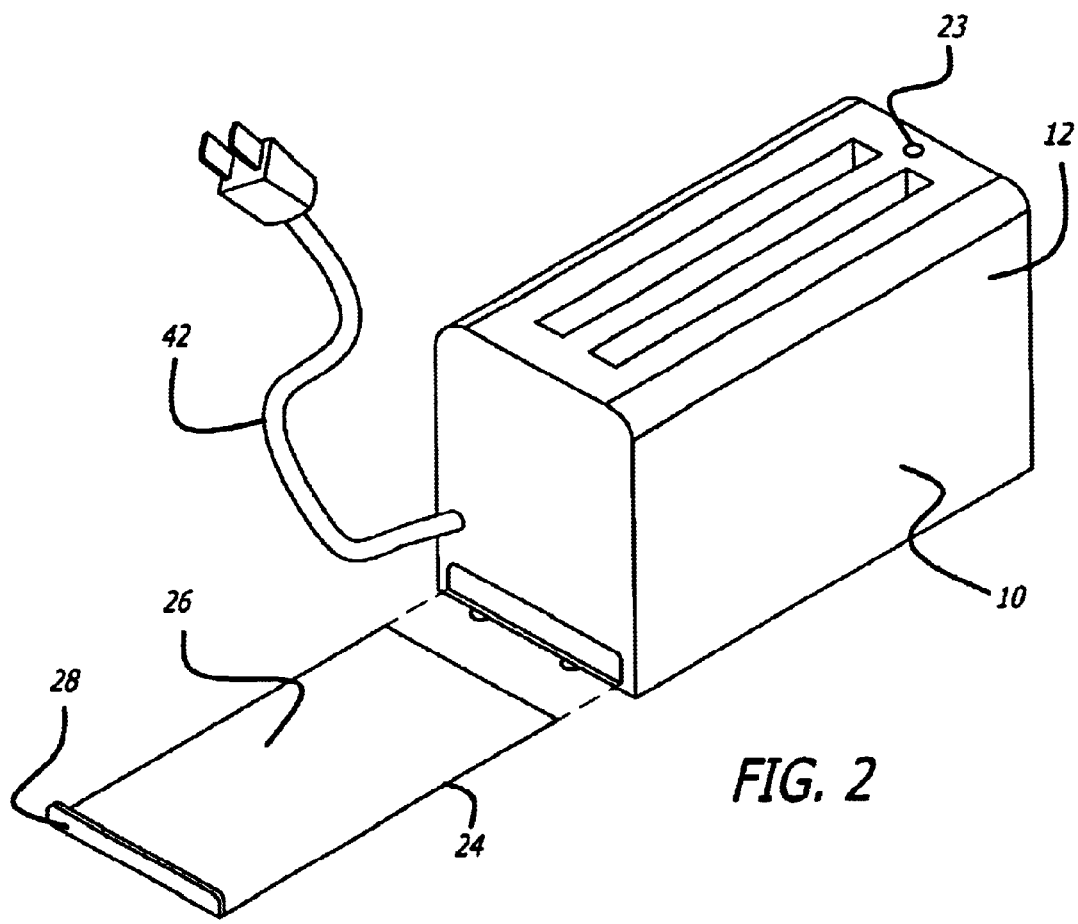
FIG. 2 is a rear perspective view of the controllable override electric toasting apparatus showing a toast residual tray.

FIG. 2 shows a rear perspective view of the controllable override electric toasting apparatus. The toasting apparatus 10 also includes a toast residual tray 24. The toast residual tray 24 is slidably positioned below the carriage assembly within the toaster body 12 to catch any items falling out of the carriage assembly. The toast residual tray 24 is accessible from a side of the toasting apparatus 10 and is slidable in and out of the toaster body 12. The toast residual tray 24 may comprise a metal tray 26 and a handle 28 for easy removal and insertion into the toaster body 12.

Figure 3:
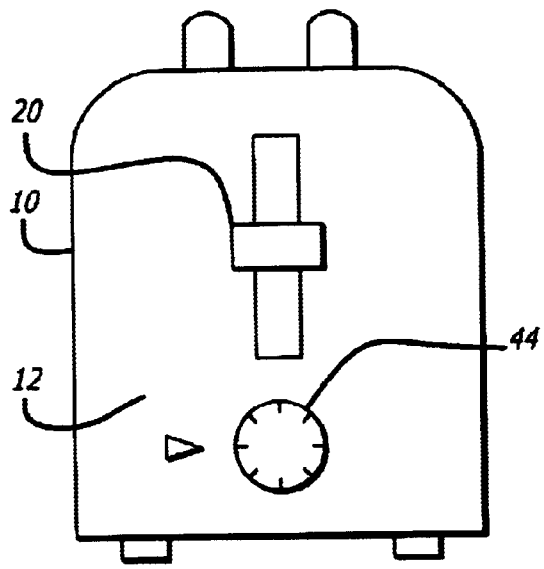
FIG. 3 is a side view of the controllable override electric toasting apparatus with the carriage control handle in an initial raised position.
Figure 4:
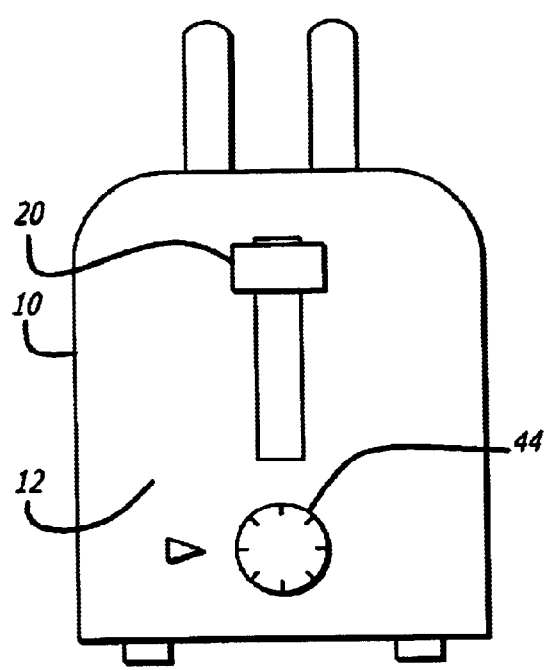
FIG. 4 is a side view the controllable override electric toasting apparatus with the carriage control handle in a maximum raised position.
Figure 5:
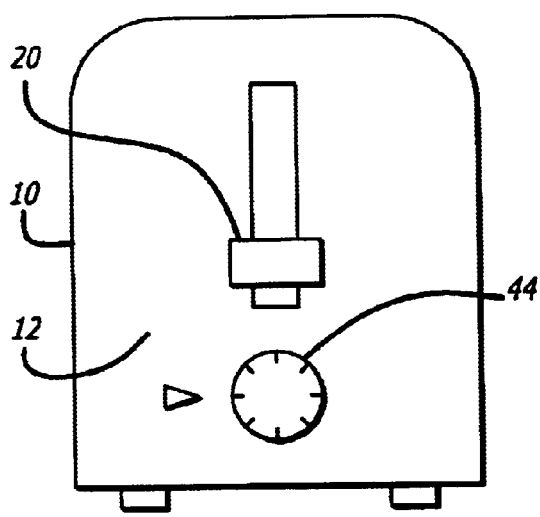
FIG. 5 is a side view of the controllable override electric toasting apparatus with the carriage control handle in a maximum lowered position.

FIGS. 3, 4, and 5 are side views of the controllable override electric toasting apparatus. These figures show examples of the positioning of the carriage control handle 20. In FIG. 3, the carriage control handle 20 is in its initial raised position. In this position, items may be placed in the toasting apparatus 10 to be lowered into the toaster body 12. FIG. 4 shows another example in which the carriage control handle 20 has been lifted to its maximum raised position. This position can be used when smaller items have been placed into the toaster body 12 and cannot be removed when the carriage control handle 20 is in its initial raised position as shown in FIG. 3. FIG. 5 shows the carriage control handle 20 in its maximum lowered position. This position is used when items placed in the toaster body 12 are being toasted.

The toasting apparatus 10 also includes a carriage control rod 30 vertically disposed within the toaster body 12. A first damping spring 32 is wrapped around the carriage control rod 30 at a first end 31. The first damping spring 32 is capable of being compressed to raise the carriage assembly beyond its initial raised position, and is also capable of being stretched to lower the carriage assembly. A second damping spring 34 is wrapped around the carriage control rod 30 at a second end 35. The second damping spring 34 has sufficient strength to support the carriage assembly in its initial raised position. It is also capable of being compressed to lower the carriage assembly and stretched to raise the carriage assembly beyond the initial raised position.

The carriage control handle 20 is coupled to a first sliding member 36 perpendicularly disposed relative to the carriage control rod 30. The first sliding member 36 includes a first electromagnetic plate 38. The first sliding member 36 is coupled to the carriage assembly by a second sliding member 40 to facilitate movement of the carriage assembly with the carriage control handle 20. The second sliding member 40 couples to the carriage member 46. The depression of the carriage control handle 20 causes the first and second sliding members 36 and 40 to slide downward on the carriage control rod 30, thereby moving the carriage assembly and items placed in the openings 14 and 16 down into the toaster body 12. Conversely, the lifting of the carriage control handle 20 causes items to be raised within the toaster body 12.

The toasting apparatus 10 is connected to a power supply by an electrical cord and plug 42. The electrical cord and plug 42 provides an electrical power source for at least one heating element, which is disposed within the toaster body 12. The toasting apparatus 10 may have a single heating element disposed within the toaster body 12, or in another embodiment, a plurality of heating elements disposed within the toaster body 12. Because the toasting apparatus 10 may have either one or many heating elements, for the purpose of simplicity this specification will refer to one heating element. However, it is to be understood that additional heating elements may also be included.

The heating element included within the toasting apparatus 10 heats items when the electrical power source is applied. The toasting apparatus 10 also includes an interrupt mechanism configured to turn off the electrical power source when the carriage assembly becomes jammed within the toaster body 12. The interrupt mechanism turns off the electrical power source by interrupting the flow of current to the heating element.

The toaster body may also include at least one guide for keeping items separated from the heating element. The guide is disposed within the toaster body 12 and is fixedly positioned to prevent contact between items and the heating element. The guide also maintains items in a proper orientation within the toaster body 12.

The toasting apparatus 10 also includes an axially-oriented toasting control member 44, provided to set the amount of time that the heating element provides heat to items placed within the toaster body 12. The toasting control member 44 is rotatable about a central axis and positioned on a side of the toaster body 12. A user may turn the toasting control member 44 to adjust the amount of time that heat is applied to items placed within the toaster body 12.

Figure 6:
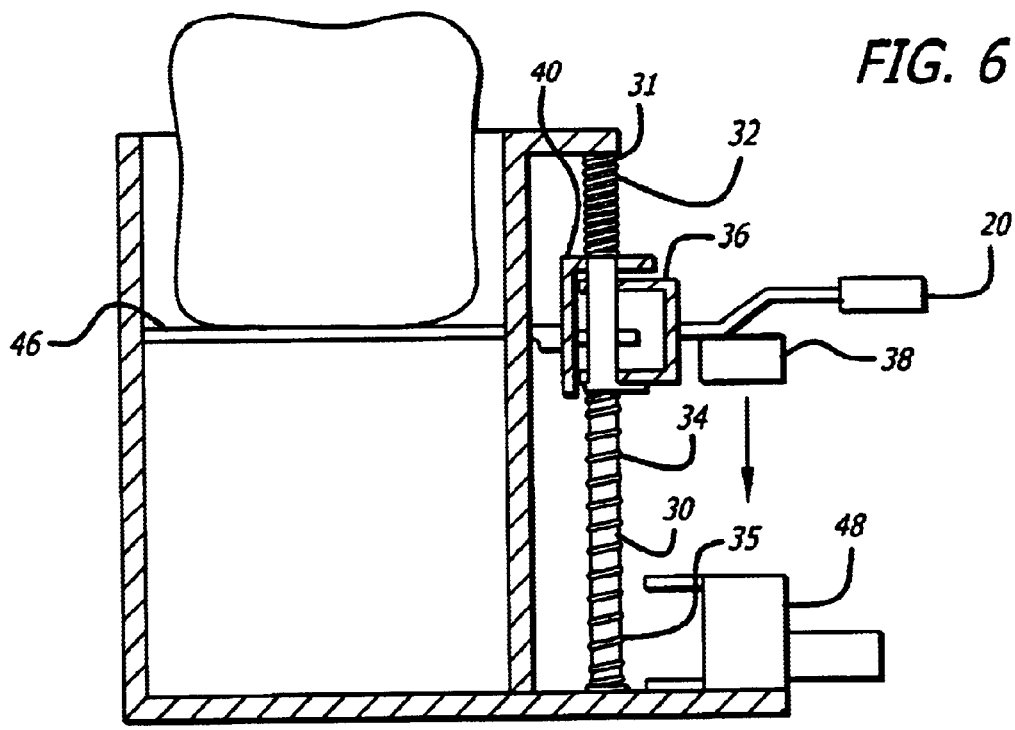
FIG. 6 is a diagrammatic cross-sectional view of the controllable override electric toasting apparatus showing the carriage control handle 20 in its initial raised position.

FIG. 6 shows a diagrammatic cross-sectional view of the toasting apparatus 10 of the present invention. FIG. 6 shows the carriage control handle 20 in its initial raised position. The carriage control handle 20 is coupled to the first sliding member 36 having a first electromagnetic plate 38 that is part of an electromagnet assembly. The carriage control handle 20 is also coupled to the carriage control rod 30 vertically disposed within the toaster body 12. FIG. 6 also shows the second damping spring 34 coupled to the carriage control rod 30. Movement of the carriage control handle 20 from the position shown in FIG. 6 may be either upwards to raise the carriage member 46 to remove small items from the toaster body or in a downward manner to lower items placed in the toaster body 12 for toasting.

Figure 7:
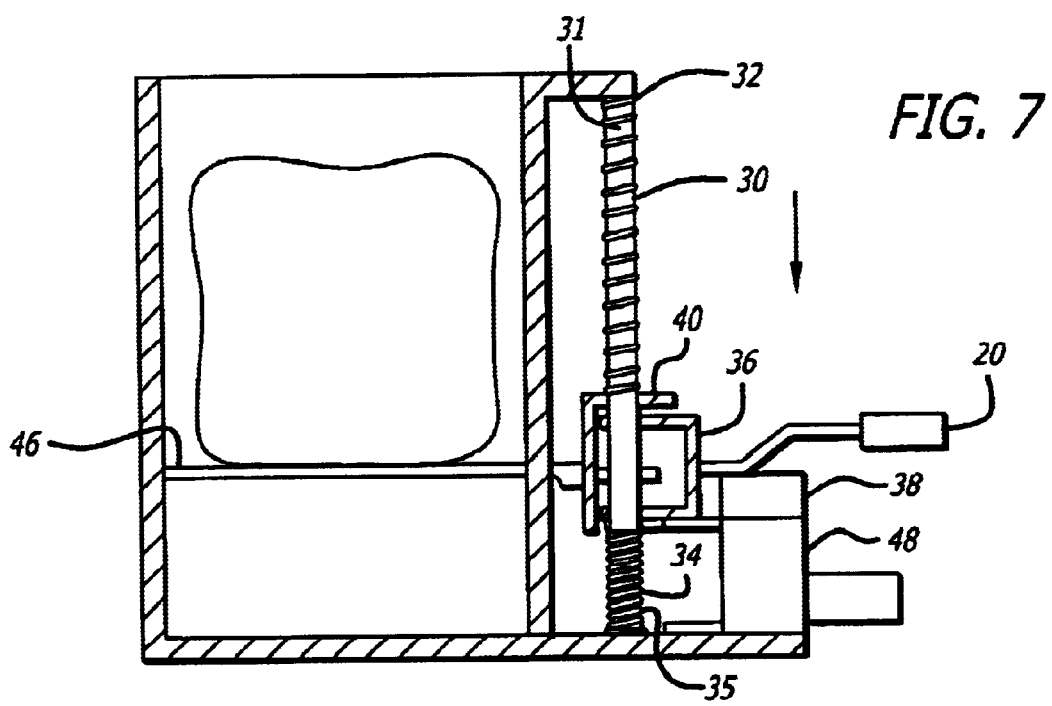
FIG. 7 is a diagrammatic cross-sectional view of the controllable override electric toasting apparatus showing the carriage control handle in its maximum lowered position.

FIG. 7 also shows a diagrammatic cross-sectional view of the toasting apparatus 10. In FIG. 7, the carriage control handle 20 is shown in its maximum lowered position such that the first electromagnetic plate 38 is electromagnetically coupled to a second electromagnetic plate 40. The second electromagnetic plate 40 is electrically coupled to a circuit to receive current from the power supply. When the first and second electromagnetic plates 38 and 48 are coupled together, current is applied to the heating element within the toasting apparatus 10 and items placed within the toaster body 12 are then toasted. When a user lowers the carriage control handle 20 by applying pressure in a downward manner, the second damping spring 34 positioned on the carriage control rod 30 is compressed. This allows the first electromagnetic plate 38 to couple with the second electromagnetic plate 48 and hold the carriage assembly in a lowered position while heat is applied to items placed in the toasting apparatus 10.

The depression of the carriage control handle 20 to the point where the first and second electromagnetic plates 38 and 48 couple initiates the application of heat to items in the toaster body 12. Current is supplied when the first and second electromagnetic plates 38 and 48 come in contact with each other. A switch in an electronic circuit is closed as the first and second electromagnetic plates 38 and 48 couple, thereby causing current to flow to the heating element in the toaster body 12. A timer controls the amount of time the first and second electromagnetic plates 38 and 38 are coupled together. This timer is set by the user with the toasting control member 44. When the time is up for the application of heat to the items, the first and second electromagnetic plates 38 and 48 disengage, thereby opening the circuit and cutting the power to the heating element. When items become jammed in the toaster body and prevent the first and second electromagnetic plates 38 and 48 from disengaging, the interrupt mechanism cuts power to the toaster body and allows the items to be removed. The interrupt mechanism is an electronic circuit that opens the switch when the disengagement of the first and second electromagnetic plates 38 and 48 fails to occur. The interrupt mechanism therefore detects when the first and second electromagnetic plates 38 and 48 continue to contact each other after the time to stop the application of heat to the toaster body 12 passes. The interrupt mechanism operates to open the switch and cease the flow of current to the toaster body 12 when this condition occurs.

Figure 8:
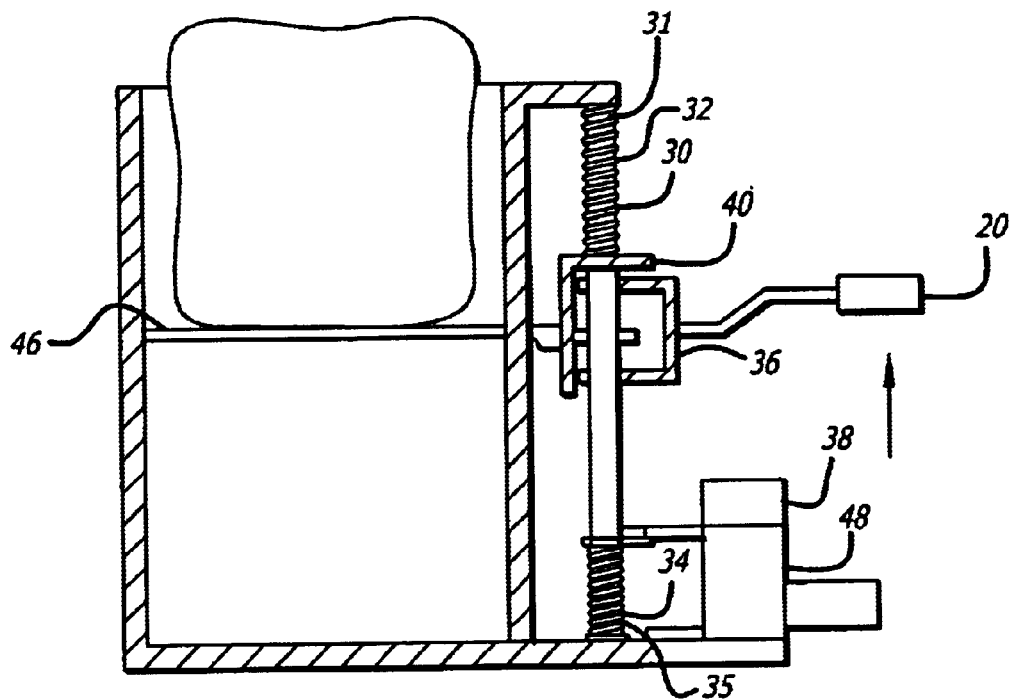
FIG. 8 is a diagrammatic cross-sectional view of the controllable override electric toasting apparatus showing the carriage control handle in a position below its initial raised position.

FIG. 8 is a diagrammatic cross-sectional view of the toasting apparatus 10. In FIG. 8, the carriage control handle 20 is shown in a position below its initial raised position. This figure shows an embodiment of the invention in which the carriage member 46 can be raised while the first and second electromagnetic plates 38 and 48 are coupled and heat is being applied to the toaster body 12. A person using the toasting apparatus 10 can therefore view the progress of the toasting of items in the toaster body 12 by lifting the carriage control handle 20 while the first and second electromagnetic plates 38 and 48 are coupled together. The lifting of the carriage control handle 20 does not disengage the coupling between the first and second electromagnetic plates 38 and 48 while heat is being applied. Thus, the carriage member 46 can be raised during toasting without interrupting the application of heat to items placed in the toasting apparatus 10.

The carriage member 46 can also be lifted while in its maximum lowered position by depressing the carriage release button 23 and lifting the carriage control handle 20. The carriage release button 23 operates as an additional interrupt mechanism for the circuit controlling the application of heat to the toaster body 12. Depression of the carriage release button 23 opens the switch in the circuit by disengaging the first and second electromagnetic plates 38 and 48 and allowing the carriage member 46 to be raised. Thus, the carriage release button 23 interrupts the coupling of the first and second electromagnetic plates 38 and 48. This interrupt mechanism is used when the user is satisfied with the toasting of items in the toaster body 12 and wishes to remove items placed in it.

Figure 9:
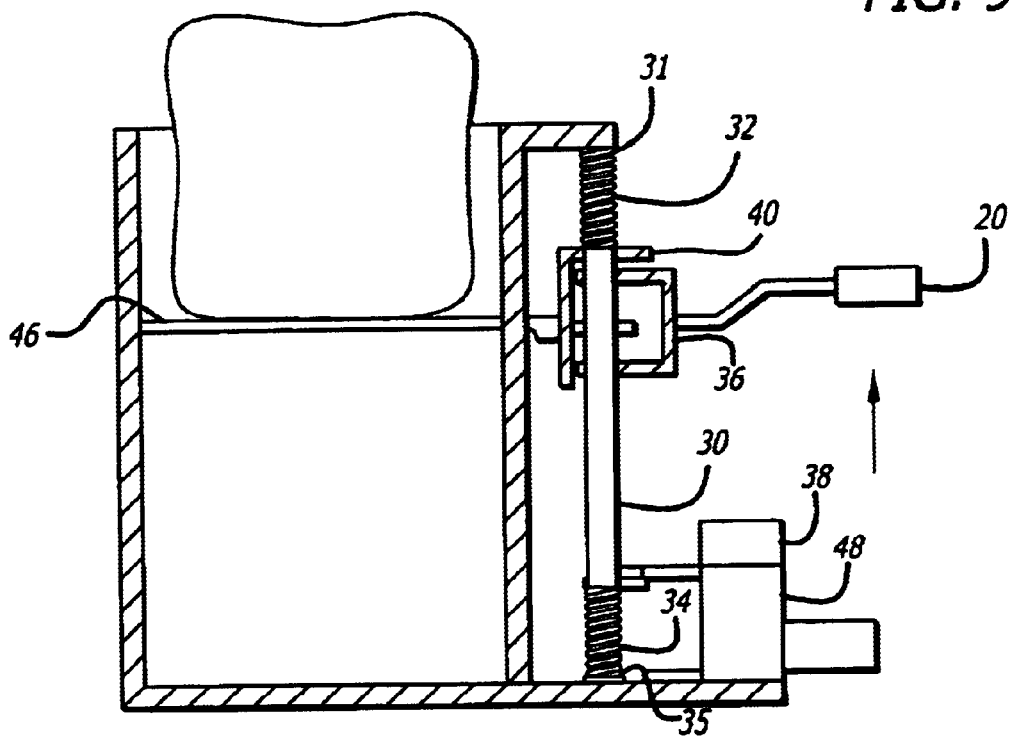
FIG. 9 is a diagrammatic cross-sectional view of the controllable override electric toasting apparatus showing the carriage control handle in its maximum raised position.

FIG. 9 also shows a diagrammatic cross-sectional view of the toasting apparatus 10. In FIG. 9, the carriage control handle 20 is shown in its maximum raised position relative to the toaster body 12. This position is achieved after the carriage control handle 20 is in its initial raised position. When items are in the toaster body 12 but are too small to be removed when the carriage assembly is in its initial raised position, the carriage control handle 20 is movable upward to facilitate the removal of the items. A user applies upward pressure to the carriage control handle 20. The first damping spring 32 positioned around the carriage control rod 30 compresses to allow the carriage assembly to rise to allow the removal of the items.

What is claimed is:

1. A controllable override electric toasting apparatus, comprising:
    a toaster body having a support rack, at least one heating element, and at least one opening disposed therein, the support rack coupled to a carriage assembly having a slidable carriage control handle positioned along a carriage control rod;
    an electromagnet assembly disposed within the toaster body, the electromagnet assembly configured to activate the at least one heating element and releasably hold the carriage assembly in a toasting position when the carriage assembly is moved from an initial raised position, wherein when the at least one heating element is activated, the support rack is slidable within the toaster body while the carriage assembly remains releasably held in the toasting position without deactivating the at least one heating element; and
    an interrupt mechanism disposed within the toaster body and configured to deactivate the at least one heating element if the support rack becomes jammed after a toasting cycle,
    wherein the carriage control rod includes a first end disposed within the toaster body and a first damping spring disposed within the toaster body along the first end to allow the carriage control handle to be moved toward the at least one opening and beyond the initial raised position.

2. The controllable override electric toasting apparatus of claim 1, further comprising an electrical power source for the at least one heating element.

3. The controllable override electric toasting apparatus of claim 1, wherein the electromagnet assembly comprises a first electromagnetic plate releasably coupled to the carriage control handle and a second electromagnetic plate fixedly disposed within the toaster body.

4. The controllable override electric toasting apparatus of claim 3, wherein said at least one heating element is activated when the first electromagnetic plate electromagnetically couples with the second electromagnetic plate.

5. The controllable override electric toasting apparatus of claim 1, wherein the carriage control rod is fixedly disposed within said toaster body, the carriage control handle being capable of slidably moving along the carriage control rod to move the carriage assembly.

6. The controllable override electric toasting apparatus of claim 1, wherein the carriage control handle is slidably movable within an additional opening on a side of the toaster body.

7. The controllable override electric toasting apparatus of claim 1, further comprising plurality of slotted openings in a top surface of the toaster body.

8. The controllable override electric toasting apparatus of claim 1, further comprising a toasting control member axially oriented on a side of said toaster body to set the amount of time the at least one heating element provides heat to the toaster body.

9. The controllable override electric toasting apparatus of claim 1, further comprising a horizontally oriented toast residual tray, said toast residual tray being slidably disposed below the carriage assembly.

10. The controllable override electric toasting apparatus of claim 1, further a carriage release button disposed on said toaster body.

11. A method of controllably overriding an electric toasting apparatus, comprising:
    providing a carriage assembly having a support rack and a slidable carriage control handle positioned along a carriage control rod, the carriage assembly disposed within a toaster body having at least one opening and at least one heating element therein;

activating the at least one heating element and releasably holding the carriage assembly in a toasting position when the carriage assembly is moved from an initial raised position, wherein when the at least one heating element is activated, the support rack is slidable within the toaster body while the carriage assembly remains releasably held in the toasting position without deactivating the at least one heating element;

allowing the carriage control handle to be moved toward the at least one opening and beyond the initial raised position; and deactivating the at least one heating element if the support rack becomes jammed after a toasting cycle.

12. The method of claim 11, further comprising providing an electrical power source for the at least one heating element.

13. The method of claim 11, wherein the activating the at least one heating element a d releasably holding the carriage assembly in a toasting position when the carriage control handle is moved from an initial raised position includes engaging an electromagnet assembly disposed within the toaster body.

14. The method of claim 13, wherein the electromagnet assembly includes a first electromagnetic plate releasably coupled to the carriage control handle and a second electromagnetic plate fixedly positioned within the toaster body, the at least one heating element being activated by moving the carriage control handle so that the first electromagnetic plate releasably engages the second electromagnetic plate.

15. The method of claim 11, wherein the deactivating the at least one heating element if the support rack becomes jammed after a toasting cycle includes engaging an interrupt mechanism disposed within the toaster body.

16. The method of claim 11, wherein the allowing the carriage control handle to be moved toward the at least one opening and beyond the initial raised position includes providing a carriage control rod having a first end disposed within the toaster body and a first damping spring disposed within the toaster body along the first end.

17. The method of claim 16, further comprising positioning the carriage control rod within said toaster body, the carriage control handle slidably moving along the carriage control rod to move the carriage assembly and the support rack.

18. The method of claim 11, further comprising providing a toasting control member axially oriented on a side of said toaster body to set the amount of time the at least one heating element is activated.

19. The method of claim 11, further comprising slidably positioning a horizontally oriented toast residual tray below the carriage assembly.

20. The method of claim 15, further comprising providing a carriage release button to manually cut off the power source to the at least one heating element.

21. The method of claim 11, further comprising including a plurality of slotted openings in a top surface of the toaster body.

22. An electric toasting apparatus, comprising:

a toaster body having a support rack, at least one heating element, and at least one opening disposed therein, the support rack coupled to a carriage assembly having a slidable carriage control handle positioned along a carriage control rod;

means for activating the at least one heating element and releasably holding the carriage assembly in a toasting position;

means for allowing the support rack to be movable within the toaster body while the carriage assembly remains releasably held in the toasting position and without deactivating the at least one heating element; and means for deactivating the at least one heating element if the support rack becomes jammed after a toasting cycle.

23. The apparatus of claim 22, further comprising an electrical power source for the at least one heating element.

24. The apparatus of claim 22, wherein the means for activating the at least one heating element and releasably holding the carriage assembly in a toasting position includes an electromagnet assembly disposed within the toaster body.

25. The apparatus of claim 24, wherein the electromagnet assembly comprises a first electromagnetic plate releasably coupled to the carriage control handle and a second electromagnetic plate fixedly disposed within the toaster body.

26. The apparatus of claim 25, wherein said at least one heating element is activated when the first electromagnetic plate releasably engages the second electromagnetic plate.

27. The apparatus of claim 26, wherein the means for allowing the support rack to be movable within the toaster body while the carriage assembly remains releasably held in the toasting position and without deactivating the at least one heating element includes decoupling the carriage control handle from the first electromagnetic plate after the heating element is activated to free the support rack to move within the toaster body.

28. The apparatus of claim 22, wherein the means for deactivating the at least one heating element when the support rack becomes jammed after a toasting cycle includes an interrupt mechanism.

29. The apparatus of claim 22, further comprising means for allowing the carriage control handle to be moved toward the at least one opening and beyond an initial raised position.

30. The apparatus of claim 29, wherein the means for allowing the carriage control handle to be moved toward the at least one opening and beyond the initial raised position includes providing a carriage control rod including a first end disposed within the toaster body and a first damping spring disposed within the toaster body along the first end to allow the carriage control handle to be moved toward the at least one opening and beyond the initial raised position.

31. The apparatus of claim 22, wherein the carriage control rod is fixedly disposed within said toaster body, the carriage control handle being capable of slidably moving along the carriage control rod to move the carriage assembly.

32. The apparatus of claim 22, wherein the carriage control handle is slidably movable within an additional opening on a side of the toaster body.

33. The apparatus of claim 22, further comprising a plurality of slotted openings in a top surface of the toaster body.

34. The apparatus of claim 22, further comprising a toasting control member axially oriented on a side of said toaster body to set the amount of time the at least one heating element provides heat to the toaster body.

35. The apparatus of claim 22, further comprising a horizontally oriented toast residual tray, said toast residual tray being slidably disposed below the carriage assembly.

* * * * *